March 22, 1960  E. P. AGHNIDES  2,929,567
LIQUID AND GAS MIXING DEVICE
Original Filed Feb. 18, 1953

INVENTOR
Elie P. Aghnides
BY *Moore & Hall*
ATTORNEYS

United States Patent Office 2,929,567
Patented Mar. 22, 1960

2,929,567

LIQUID AND GAS MIXING DEVICE

Elie P. Aghnides, New York, N.Y.

Continuation of application Serial No. 337,505, February 18, 1953. This application February 12, 1957, Serial No. 639,650

3 Claims. (Cl. 239—431)

This application is a continuation of Serial No. 337,505, filed February 18, 1953, now Patent No. 2,783,985, for: "Liquid and Gas Mixing Device." This invention relates to devices for producing an aerated stream of liquid, and more particularly to water aerators of the type described and claimed in my U.S. Patents No. 2,210,846, Fluid Mixing Device, granted August 6, 1940, and No. 2,316,832, Fluid Mixing Device, granted April 20, 1943. This application is analogous in subject matter to my prior copending application Serial No. 63,110, filed December 2, 1948, entitled Gas and Liquid Mixing Device, now U.S. Patent No. 2,633,343, granted March 31, 1953.

The aerators of the prior art have had their working parts in a plurality of pieces some of which may become lost during cleaning. Moreover, with the prior art aerators there is always the possibility that inexperienced persons may improperly assemble them with consequent unsatisfactory results. In my aforesaid application Serial No. 63,110, now U.S. Patent No. 2,633,343, I overcame these disadvantages by making the working parts of the aerator in the form of a one piece cartridge which could be removed and replaced as a unit. The present invention follows this same principle but includes certain improvements in construction. The primary object of this invention is to provide an improved cartridge for aerators.

In carrying out the foregoing objects, I provide an upstream disc to which the downstream screens are attached. In the preferred form of the present invention, the lower screen is in the form of a basket which has its upper or top edge connected to the upstream disc. The lower part of bottom of the basket carries one or more additional screens therein.

Figure 1:
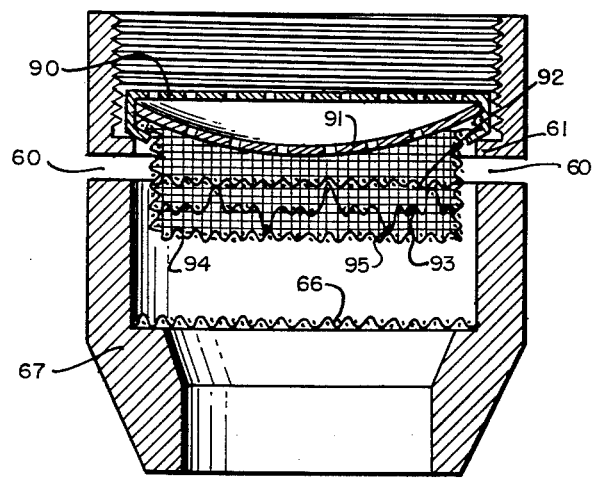
Figure 1 is a cross-sectional view of one form of the invention.

Figure 1 illustrates an aerator of the same general type as set forth in said prior patents, and employing similar principles, dimensions, screen meshes, etc. The wire screen basket 94 carries within it screen 93 having indents and raised portions 95 to space it from the bottom of the basket and from the top screen 92. The wire screen basket 94 is suspended at its upper end by the disc 90 which has its outer edge bent over to clamp the screen 94 and the outer edge of dished perforated disc 91 tightly together to hold them in place. Screen 66 may be placed, if desired, on a ledge in the casing 67. The peripheral bentover edge of disc 90 rests on a ledge 61 in the casing 67. Air inlet slots 60 permit air to enter the side of the basket 11.

Figure 2:
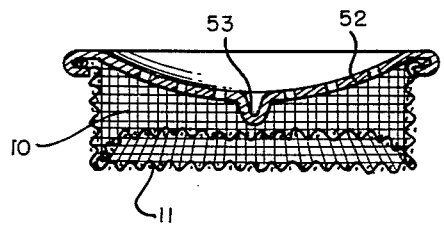
Figure 2 is a cross-section of a modified form of cartridge suitable for use in the device of Figure 1.

Figure 2 illustrates a modified form of cartridge similar to that shown in Figure 1 except that disc 52 is dished and has an indent 53 to hold screen 10 in place.

In all forms of this invention there is a cartridge having an edge projecting beyond the other parts and arranged to rest on ledge 61. The cartridge has at least one and preferably two upstream diaphragms. There is at least one screen below the diaphragms, which screen is a part of the cartridge, and in each form of the invention there may be an additional screen 66 not a part of the cartridge which rests on a ledge in the power part of casing 67.

The feature of spacing paralllel screens involving indenting them to space them from each other, is shown and described in detail in connection with Figure 12 of my said prior copending application Serial No. 63,110, now U.S. Patent No. 2,633,343, granted March 31, 1953.

The screens of Figs. 1 and 2, including screens 92, 93 and 94 of Figure 1, and screens 10 and 11 of Fig. 2 may be of the type described in more detail in connection with my copending application Serial No. 337,502, filed February 18, 1953, now Patent No. 2,787,452, entitled "Faucet Attachments." In that application there is shown and claimed unframed screens in which the individual wires of the screens are welded, soldered, cemented or otherwise rigidly attached to each other at each crossover junction.

I am not limited to the details described herein since the scope of my invention is described in the claims.

I claim to have invented:

1. An aerator for liquid under pressure comprising a casing adapted for connection to a source of liquid under pressure at one end and adapted to discharge the liquid from its other end, and a cartridge dimensioned to fit into the casing including an upstream disc and a downstream screen a portion of which contacts the disc and spaces the main body of the screen from the disc, said cartridge providing an air inlet between the disc and the screen, said disc and screen being connected together and removable as a unit from the casing, said casing admitting air to said air inlet, in which the screen is in the shape of a basket and has its upper edge attached to said disc, said disc being a dished foraminous member having its concave side facing upstream and its outer edge resting on the basket.

2. An aerator for liquid under pressure comprising a casing adapted for connection to a source of liquid under pressure at one end and adapted to discharge the liquid from its other end, and a cartridge dimensioned to fit into the casing including an upstream disc and a downstream screen a portion of which contacts the disc and spaces the main body of the screen from the disc, said cartridge providing an air inlet between the disc and the screen, said disc and screen being connected together and removable as a unit from the casing, said casing admitting air to said inlet, in which the screen is in the shape of a basket and has its upper edge attached to said disc, said disc being a dished foraminous member having its concave side facing upstream and its outer edge resting on the basket, said disc being formed so that the center thereof extends down into the basket to limit upward movement thereof.

3. An aerator as defined in claim 2 in which the sides of the basket are perpendicular to the plane of the bottom thereof.

References Cited in the file of this patent

UNITED STATES PATENTS

| | | |
|---|---|---|
| 2,224,221 | Galson | Dec. 10, 1940 |
| 2,230,278 | Walton | Feb. 4, 1941 |
| 2,316,832 | Aghnides | Apr. 20, 1943 |
| 2,541,854 | Bachli et al. | Feb. 13, 1951 |
| 2,633,343 | Aghnides | Mar. 31, 1953 |